(12) United States Patent
Ohman et al.

(10) Patent No.: US 9,382,389 B2
(45) Date of Patent: *Jul. 5, 2016

(54) METHOD FOR SEPARATING LIGNIN FROM BLACK LIQUOR, A LIGNIN PRODUCT, AND USE OF A LIGNIN PRODUCT FOR THE PRODUCTION OF FUELS OR MATERIALS

(75) Inventors: Fredrik Ohman, Gavel (SE); Hans Theliander, Göteborg (SE); Per Tomani, Huddinge (SE); Peter Axegard, Solna (SE)

(73) Assignee: Valmet Aktiebolag, Sundsvall (SE)

( * ) Notice: Subject to any disclaimer, the term of this patent is extended or adjusted under 35 U.S.C. 154(b) by 353 days.

This patent is subject to a terminal disclaimer.

(21) Appl. No.: 12/918,497

(22) PCT Filed: Feb. 21, 2008

(86) PCT No.: PCT/SE2008/000142
§ 371 (c)(1),
(2), (4) Date: Sep. 8, 2010

(87) PCT Pub. No.: WO2009/104995
PCT Pub. Date: Aug. 27, 2009

(65) Prior Publication Data
US 2010/0325947 A1    Dec. 30, 2010

(51) Int. Cl.
*D21C 11/00* (2006.01)
*C08H 8/00* (2010.01)

(52) U.S. Cl.
CPC .............. *C08H 8/00* (2013.01); *D21C 11/0007* (2013.01)

(58) Field of Classification Search
CPC .................................................. D21C 11/0007
USPC ............................................. 162/16; 530/500
See application file for complete search history.

(56) References Cited

U.S. PATENT DOCUMENTS

| | | | |
|---|---|---|---|
| 2,623,040 A | 12/1952 | Keilen | |
| 2,828,297 A * | 3/1958 | Giesen | 530/500 |
| 3,048,576 A * | 8/1962 | Ball et al. | 530/500 |
| 3,671,428 A * | 6/1972 | Kim | 507/106 |
| 4,338,091 A * | 7/1982 | Dilling | 8/524 |
| 4,740,591 A * | 4/1988 | Dilling et al. | 530/505 |
| 4,764,596 A * | 8/1988 | Lora et al. | 530/507 |
| 4,946,946 A * | 8/1990 | Fields et al. | 530/500 |
| 5,288,857 A * | 2/1994 | Aarsrud et al. | 530/500 |
| 5,635,024 A * | 6/1997 | Shall | 162/16 |
| 6,172,204 B1 * | 1/2001 | Sarkanen et al. | 530/500 |
| 7,794,824 B2 * | 9/2010 | Eckert et al. | 428/220 |
| 8,012,356 B2 * | 9/2011 | Funaoka et al. | 210/691 |
| 8,172,981 B2 * | 5/2012 | Tomani et al. | 162/16 |
| 2002/0129910 A1 * | 9/2002 | Lightner | 162/16 |
| 2003/0221804 A1 * | 12/2003 | Lightner | 162/16 |
| 2006/0169430 A1 * | 8/2006 | Tarasenko | 162/81 |
| 2008/0047674 A1 * | 2/2008 | Ohman et al. | 162/16 |
| 2008/0051566 A1 * | 2/2008 | Ohman et al. | 530/500 |
| 2008/0214796 A1 * | 9/2008 | Tomani et al. | 530/500 |
| 2008/0317661 A1 * | 12/2008 | Eckert et al. | 423/447.4 |
| 2008/0318043 A1 * | 12/2008 | Eckert et al. | 428/401 |
| 2010/0041879 A1 * | 2/2010 | Stigsson et al. | 536/127 |

FOREIGN PATENT DOCUMENTS

SE  WO2006038863  4/2006

OTHER PUBLICATIONS

Li et al. (Journal of Polymer Science Part B: Polymer Physics, vol. 35, 1899-1910, 1997).*

* cited by examiner

*Primary Examiner* — Liam J Heincer
(74) *Attorney, Agent, or Firm* — Rolf Fasth; FASTH LAW OFFICES

(57) ABSTRACT

The method is for controlling a sodium and sulphur balance of a pulp mill while separating lignin from black liquor. Lignin is precipitated by using an acid followed by filtration. The lignin filter cake thus obtained is re-suspended in acidic liquid and dewatered to form a second cake. The filtrate obtained after dewatering of the second cake is returned for washing and suspension of the first cake. Sodium sulphate-rich ESP (electrostatic precipitator) dust produced in the recovery boiler is used in the washing of the precipitated lignin cake.

12 Claims, 7 Drawing Sheets

Pilot plant study.
Titrations on lignin slurry to study acid consumption for acidification.
Lignin filter cakes from the first filtration step (10% suspension conc.) are titrated with $H_2SO_4$.

Dilution before filtration step 1

External purification

Internal source

------ = one preferred embodiment

METHOD FOR SEPARATING LIGNIN FROM BLACK LIQUOR, A LIGNIN PRODUCT, AND USE OF A LIGNIN PRODUCT FOR THE PRODUCTION OF FUELS OR MATERIALS

PRIOR APPLICATION

This application is a U.S. national phase application based on International Application No. PCT/SE2008/000142, filed 21 Feb. 2008.

The present invention relates to a method for controlling the sodium and sulphur balance of a pulp mill while separating lignin from black liquor, and also a lignin product or an intermediate lignin product obtainable by said method. The present invention also provides use of a lignin product or an intermediate lignin product for the production of fuel (solid, gaseous or liquid) or materials.

BACKGROUND OF THE INVENTION

WO2006/031175 discloses a method for separation of lignin from black liquor comprising the following steps: a) Precipitation of lignin by acidifying black liquor and thereupon dewatering, b) suspending the lignin filter cake obtained in step a) whereupon a second lignin suspension is obtained and adjusting the pH level to approximately the pH level of the washing water of step d) below, c) dewatering of the second lignin suspension, d) addition of washing water and performing a displacement washing at more or less constant conditions without any dramatic gradients in the pH, and e) dewatering of the lignin cake produced in step d) into a high dryness and displacement of the remaining washing liquid in said filter cake, whereby a lignin product is obtained which has an even higher dryness after the displacement washing of step e).

WO2006/038863 discloses a method for precipitating (separation) of lignin, using small amounts of acidifying agents, whereby a lignin product or an intermediate lignin product is obtained which can be used as fuel or chemical feed stock (or as a chemical or a raw material for further refining), from a lignin containing liquid/slurry, such as black liquor. The present invention also provides a method for separation of lignin from a lignin containing liquid/slurry, such as black liquor, whereby a more pure lignin is obtained. Said document also discloses a lignin product or an intermediate lignin product obtainable by the above methods. Said document also discloses use, preferably for the production of heat or for use as chemical, of said lignin product or intermediate lignin product.

When separating lignin from black liquor, which may be achieved through a precipitation in a process, the resulting lignin slurry may be filtered, e.g. in a filter press. The filtrate remaining in the filter cake may cause an increased acid consumption in subsequent process steps. If a large amount of sulphuric acid is added in the process, it can lead to problems with the Na/S balance in the pulp mill as well as increased chemical costs. Therefore, it would be of interest to wash the filter cake and displace the filtrate with another solution. The solubility of lignin is dependent on temperature, ionic strength and pH in the solution (Magnus Norgren, "On the Physical Chemistry of Kraft Lignin, Fundamentals and Applications", Doctoral Thesis, Physical Chemistry 1, Lund University, 2001). It is not possible to successfully wash lignin by directly applying an acidic wash liquor because of problems with plugging of the filter cake and high yield losses (Fredrik Öhman "Precipitation and separation of lignin from kraft black liquor", Forest products and Chemical Engineering, Department of Chemical and Biological Engineering, Chalmers University of Technology, Göteborg, Sweden, 2006 and Öhman, F. & Theliander, H., "Washing lignin precipitated from kraft black liquor", Paperi Ja Puu, Vol. 88, no 5, 287-292 (2006) and Öhman, F., Wallmo, H. & Theliander, H., "A Novel method for washing lignin precipitated from kraft black liquor—Laboratory trails", Nordic Pulp and Paper Research J., 22 (2007): 1, 9-16

Mixing acidic wash liquor and alkaline filtrate also leads to uncontrolled release of hydrogen sulphide, which can increase the costs of the process.

Accordingly it would be desirable to be able to provide a method for controlling the Na/S balance in a pulp mill when at the same time lignin is separated from black liquor.

SUMMARY OF THE INVENTION

The present invention provides a solution for controlling the Na/S balance in a pulp mill at the same time lignin in separated from black liquor, which there is a need for as set out above, and said invention provides, according to a first aspect, a method for separation of lignin from black liquor comprising the following steps:

a) precipitation of lignin by acidifying black liquor, preferably by using $CO_2$, resulting in a lignin suspension and if necessary followed by maturing of the lignin suspension and thereupon separation, thereby forming a cake of solid material, thus a lignin filter cake, and optionally washing the lignin filter cake with a filtrate as set out under step d), and when needed enhancement of the lignin filter cake dryness, which optionally involves conveying the filtrate back to a pulp mill, b) suspending the lignin filter cake obtained in step a) and during the suspension operation adjusting the pH level to approximately the pH level of the washing water of step d) below, preferably at least a pH below 8, whereupon a second lignin suspension is obtained and leaving said suspension to mature (age), whereby also optionally additionally acidic liquid is added, c) separation of the second lignin suspension thereby forming a second cake of solid material, thus a second filter cake, and when needed enhancement of the lignin cake dryness, and thereafter adding acidified wash water and/ or virgin acid for displacement washing and virgin washing liquid, such as clean water, also for said displacement washing followed by enhancement of the lignin filter cake dryness to the level specified for different use of lignin, and d) conveying the filtrate from step c) or selected part/-s of the filtrate from c) for using in the suspending of the lignin filter cake of step b) and/or for dilution before separation in step a) and/or addition as wash water to the filter cake produced in step a) whereby if needed the ionic strength and pH is adjusted before addition, preferably by adding ESP-dust (ElectroStatic Precipitator dust), such as pulp mill recovery boiler precipitator dust, in order to control the Na/S balance in a pulp mill.

The present invention also provides, according to a second aspect, a lignin product or an intermediate lignin product obtainable by said method. The present invention also provides, according to a third aspect, use of a lignin product or an intermediate lignin product according to the second aspect for the production of fuel (solid, gaseous or liquid) or materials.

DETAILED DESCRIPTION OF THE INVENTION

It is intended throughout the present description that the expression "acidifying" embraces any means for acidify the black liquor. Preferably the acidifying is performed by adding $SO_2(g)$, organic acids, HCl, $HNO_3$, carbon dioxide or sulphuric acid (in the form of fresh sulfuric acid or a so called "spent acid" e.g. from a chlorine dioxide generator) or mixtures thereof to said black liquor, most preferred by adding carbon dioxide or sulphuric acid.

It is intended throughout the present description that the expression "separation" embraces any means for separation. Preferably the separation is performed by using dewatering. Dewatering may be performed by using a mechanical method, such as by using centrifugation, a filter press apparatus, a band filter, a rotary filter, such as a drum filter, or a sedimentation tank, or similar equipment, or by using evaporation. Most preferred a filter press apparatus is used.

It is intended throughout the present description that the expression "filtrate" embraces any liquid obtained through any of the separation methods as set out above.

According to a preferred embodiment of the first aspect of the invention step d) also involves conveying filtrate back to a pulp mill optionally also involving that filtrate is conveyed to the black liquor before the precipitation of step a).

According to a preferred embodiment of the first aspect of the invention step d) also involves conveying filtrate from step c) either for using in a displacement washing in step a) during the separation, such as filtration, according to a) or for diluting the suspension before separation, such as filtration, and optionally displacement washing of the lignin cake, of the lignin suspension in a), wherein optionally the filtrate from step c) is adjusted regarding ionic strength and in pH, preferably to keep the pH equal to or below the pH to which precipitation in a) has been adjusted by $CO_2$, to avoid dissolution of lignin. The ionic strength is optionally adjusted preferably to keep the ionic strength equal or higher than the ionic strength in the lignin slurry which is filtered in a). However a lower pH of the filtrate from c) to be used as wash water and/or dilution liquid in a) results in less demand for ionic strength adjustments.

According to a preferred embodiment of the first aspect of the invention the fresh acidic liquid added in step b) is sulphuric acid and/or residual acid from chlorine dioxide manufacture, i.e. sesquisulfate, and/or acidic scrubber liquid, preferably sulphuric acid and sequisulfate.

According to a preferred embodiment of the first aspect of the invention the fresh acidic liquid added in step b) is virgin sulphuric acid and/or sulphuric acid and/or sulphurous acid both obtained from gaseous $SO_2$ in turn obtained from rich gases and/or by collecting recycled $H_2S$ gas from the suspending step b) and converting it into said $SO_2$, or sulphuric acid obtained by electrolysis of sodium sulphate. Said sodium sulphate is preferably emanating from ESP-dust (Electro-Static Precipitator dust) (also known as ESP-catch or ESP-ash). The recovery boiler in a pulp mill produces significant amount of ESP-dust which contains mainly sodium sulphate. This ESP-dust may to a large extent be recycled to the recovery boiler. Some amounts may further be removed to adjust imbalances in S or Na in the recovery cycle. Said sodium sulphate may as set out above be converted into sodium hydroxide and sulphuric acid by electrolysis (see e.g. U.S. Pat. No. 4,561,945). The sodium hydroxide can further be used in different positions in the pulp mill such as the bleach plant or in the recovery area. This approach eliminates the need for purchased sulphuric acid, the need to purge excess S by purging ESP-dust and thus the intake of sodium make up can be eliminated.

According to a preferred embodiment of the first aspect of the invention the virgin sulphuric acid and/or sulphuric acid and/or sulphurous acid obtained from $SO_2$ is added to the filtrate conveyed in step d).

According to a preferred embodiment of the first aspect of the invention step b) and/or c) involve addition of acidic liquid and/or virgin acid and/or $CO_2$, whereby the addition of acidic liquid and/or acid and/or $CO_2$ is increased if necessary and in step d) filtrate is conveyed for performing a soap acidulation thereby providing tall oil.

According to a preferred embodiment of the first aspect of the invention step d) also involves conveying filtrate or specific parts of the filtrate to an external treatment step such as different types of effluent treatments.

According to a preferred embodiment of the first aspect of the invention a salt is added before the separation (preferably filtration) of step c) and/or during the suspending in step b) thereby avoiding a low pH level, preferably said salt is ESP dust, such as recovery boiler ashes or boiler dust.

According to a preferred embodiment of the first aspect of the invention the filtrate from step c) is adjusted, when to be before the separation, preferably filtration, in step a) or as wash water in step a) separation, when regarding ionic strength and in pH, preferably to keep the pH equal to or below the pH to which precipitation in a) has been adjusted by $CO_2$, to avoid dissolution of lignin involving adding a salt, preferably said salt is ESP dust, such as recovery boiler ashes or boiler dust, or sodium sulphate.

According to a preferred embodiment of the first aspect of the invention step b) involves adjusting the pH level to approximately the pH level of the washing water of step c) below, preferably a pH below 8.

According to a preferred embodiment of the first aspect of the invention the separation of step a) and/or step c) is performed using dewatering in a filter press apparatus wherein the filter cake is blown through by gas or a mixture of gases, preferably flue gases, air or steam (vapour), most preferred air or overheated steam, in order to dispose of the remaining liquid.

According to a preferred embodiment of the first aspect of the invention the pH level is adjusted to below approximately pH 6 in step b), preferably below approximately pH 4, most preferred the pH level is a pH from 1 to 3.5.

According to a preferred embodiment of the first aspect of the invention the washing water used in step c) has a pH level of below approximately pH 6, preferably below approximately pH 4, most preferred the pH level is a pH from 1 to 3.5.

According to a preferred embodiment of the first aspect of the invention the lignin filter cake dryness of the filter cake obtained in step a) and/or c) is enhanced by displacement of the remaining liquid with gas or a mixture of gases, preferably flue gases, air, steam or superheated steam, most preferred air or superheated steam.

According to a preferred embodiment of the first aspect of the invention the filtrate from the first separation (preferably involving filtration) stage step a) is re-circulated directly to the pulp mill recovery system, if necessary, after re-alkalization.

According to a preferred embodiment of the first aspect of the invention the remaining washing liquor in the filter cake in step c) is removed as far as possible with air or flue gases, preferably flue gases from a recovery boiler, a lime kiln or a bark boiler, or steam or superheated steam.

The problems mentioned above can accordingly be solved by washing the lignin filter cake with a solution with sufficient ionic strength to keep the lignin in solid form. The solutions should preferably be prepared using substances that will not cause problems in the pulp mill recovery cycle or other parts of the pulp mill, and most preferred substances that already exist in the pulp mill to avoid disruptions of the chemical balances (example: recovery boiler ash). If the filtrates from the above described process are not recycled back to the pulp mill, other substances can also be used. The pH of the wash solution should preferably be equal to, or lower, than the precipitation pH but preferably not low enough to cause substantial uncontrolled release of hydrogen sulphide when it is mixed with alkaline filtrate. The temperature of the solution should preferably be the same as for the separation, preferably filtration, to avoid excessive energy consumption for heating and cooling.

Preferred features of each aspect of the invention are as for each of the other aspects mutatis mutandis. The prior art documents mentioned herein are incorporated to the fullest extent permitted by law. The invention is further described in the following example in conjunction with the appended figures, which do not limit the scope of the invention in any way. Embodiments of the present invention are described in more detail with the aid of an example of embodiments, the only purpose of which is to illustrate the invention and are in no way intended to limit its extent.

EXAMPLES

Examples

Washing Lignin in the First Filtration Stage of the Process According to the First Aspect of the Invention Two examples are given below where the method of the first aspect of the invention as set above is successfully applied in order to reduce the sulphuric acid consumption in the subsequent lignin washing steps, which thus enables the controlling of the Na/S balance in a pulp mill.

Example 1

Figure 3:
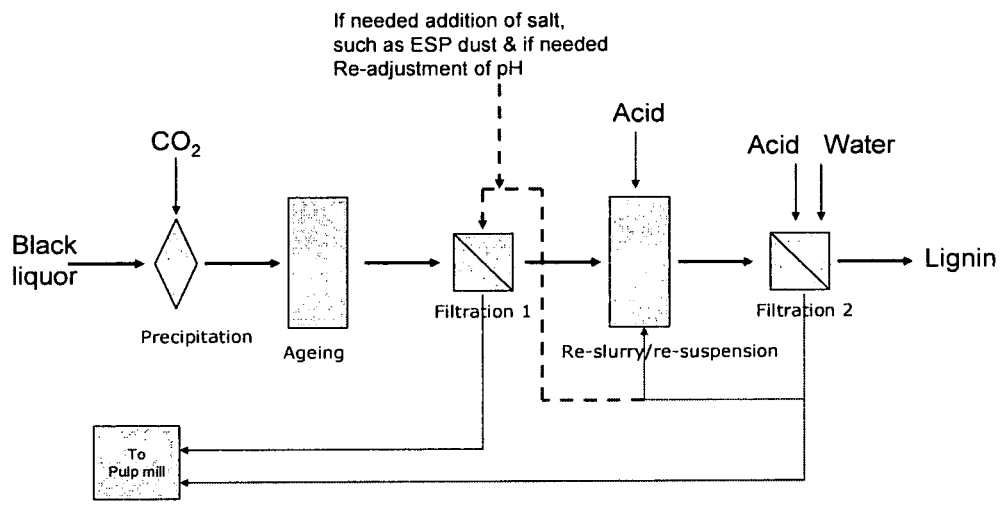
FIG. 3 shows one preferred embodiment of the present invention; washing in filtration step 1.
Figure 4:
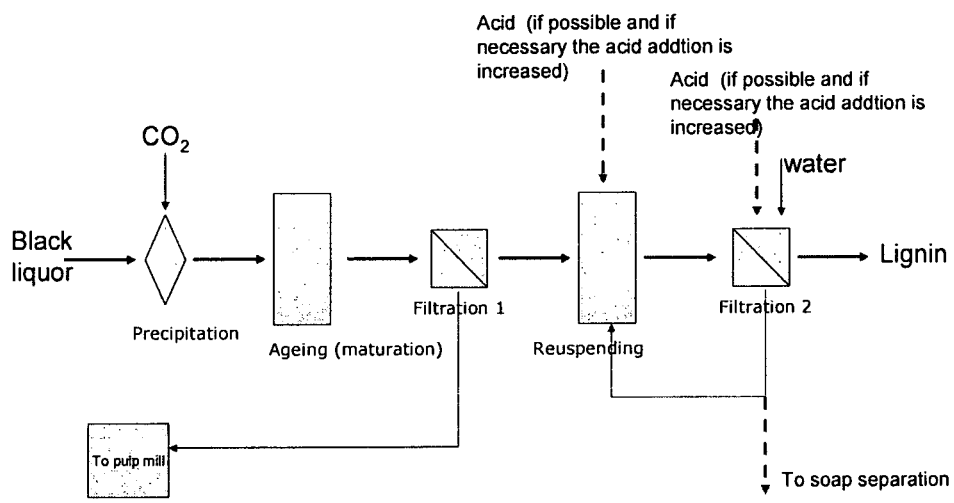
FIG. 4 shows one preferred embodiment of the present invention; use of an acid rich filtrate flow from step c) to the pulp mill soap separation process (soap acidulation).
Figure 5:
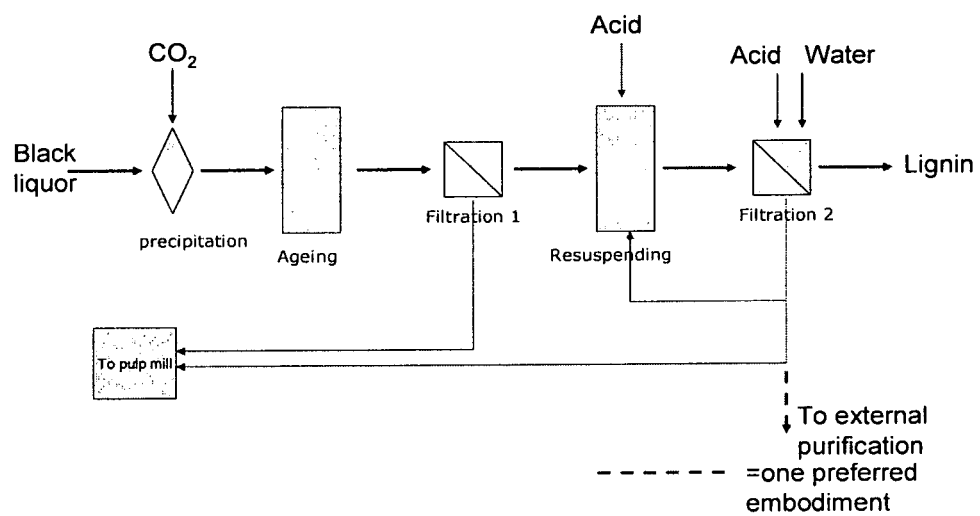
FIG. 5 shows one preferred embodiment of the invention; discharge of an acid rich filtrate from step c) into the external treatment.
Figure 6:
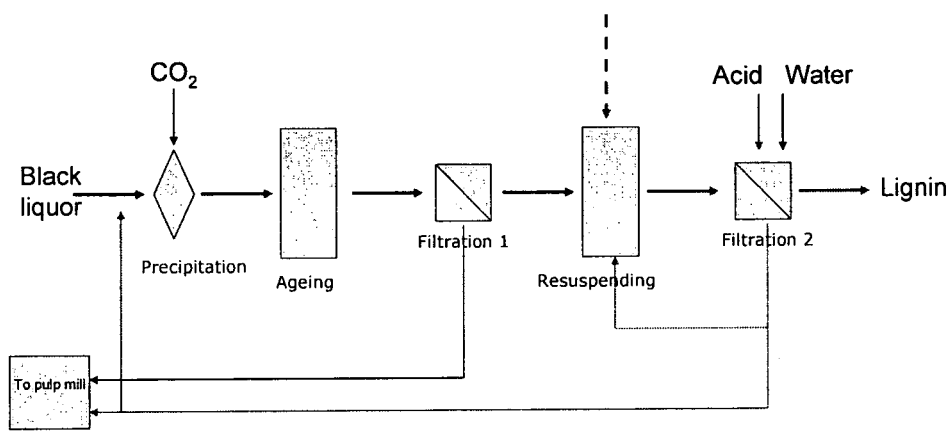
FIG. 6 shows one preferred embodiment of the present invention; use of an internal source for acidification, such as remaining acid from ClO2-production in the pulp mill.
Figure 7:
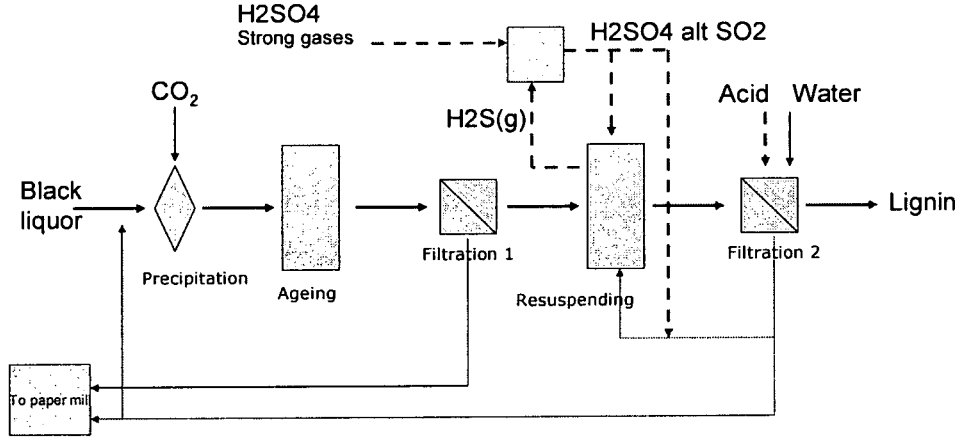
FIG. 7 shows one preferred embodiment of the present invention; use of H2S to SO2 or sulphuric acid produced from strong gases in the pulp mill.

Lignin was precipitated according to the method of the first aspect of the invention (see in particular appended FIG. 3). A filter cake of lignin was formed in a filter press. The filter cake was successfully washed by applying in this specific example a 7.5%-w solution of sodium sulphate in water. Sodium sul-phate was chosen since it can be brought back to the recovery system without problems, is used by many kraft pulp mills as a make-up chemical, and is often also produced internally in the mill in many cases in form of sodium sesquisulphate for chlorine dioxide production in pulp bleaching. The sulphuric acid consumption in the subsequent re-slurrying stage could be reduced from the reference case (a filter cake pressed and air-dried to approximately 65% DS) by 50%.

Example 2

Lignin was precipitated according to the method of the first aspect of the invention (see in particular appended FIG. 3). A filter cake of lignin was formed in a filter press. The filter cake was successfully washed by applying in this specific example a 10%-w solution of recovery boiler precipitator dust (which is an ESP-dust) in water. The recovery boiler dust consists mainly of sodium sulphate, and is normally mixed together with strong black liquor before firing in the recovery boiler. The sulphuric acid consumption in the subsequent re-slurrying stage could be reduced in the same way as in Example 1.

The sulphuric acid consumption was lowered 170-180 kg/ton lignin to 90-105 kg/ton lignin. Experiments with the half amount of washing water gave also logically results between the well washed filter cake and the unwashed filter cake.

In the pilot plant study as set out above titrations were done on lignin slurry to study acid consumption for acidification. Lignin filter cakes from the first filtration step (10% suspension conc.) were titrated with $H_2SO_4$. The below appearing parameters were used in the pilot plant study:

Wash procedure according to the method of the first aspect of the invention during 2.5 minutes; test 1

Wash procedure according to the method of the first aspect of the invention during 2.5 minutes; test 2

Wash procedure according to the method of the first aspect of the invention during 5 minutes; test 1

Wash procedure according to the method of the first aspect of the invention during 5 minutes; test 2

Reference 1, 2 and 3 was without washing.

Figure 1:
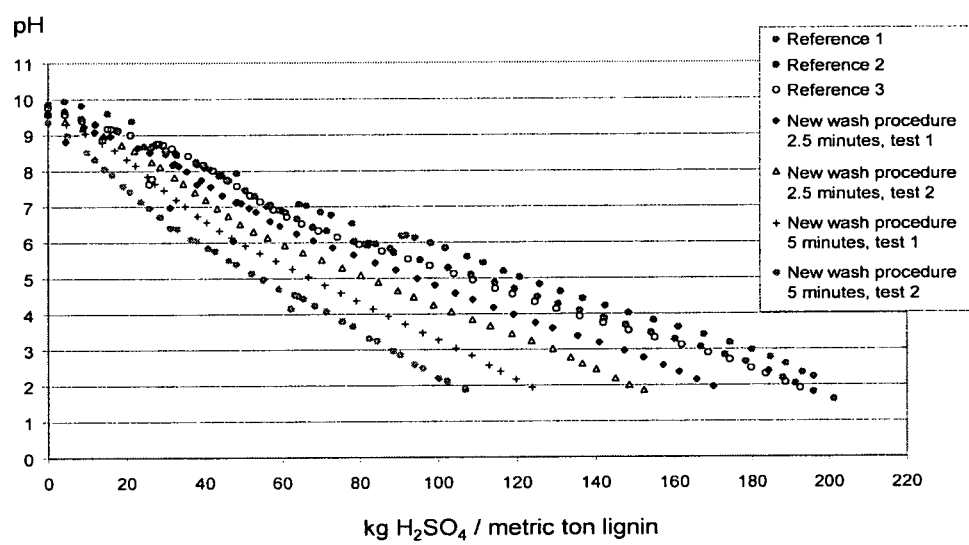
FIG. 1 shows the results obtained in a pilot plant study where acid addition in step b) is reduced according to the method of the present invention.
Figure 2:
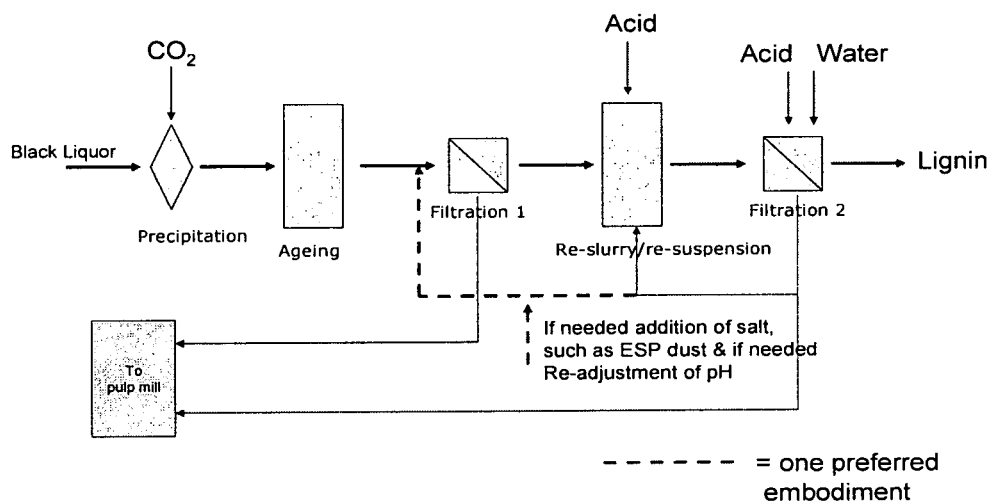
FIG. 2 shows one preferred embodiment of the present invention; dilution before filtration step 1.

As can be seen from FIG. 1 the wash procedure according to the first aspect of the invention during 5 minutes (test 2) gave the best results. There the washing was driven as far as possible.

Example 3

In a case with a pulp mill producing 350.000 tonnes of pulp with 50.000 tonnes/year lignin production with the process as set out above according to the first aspect the need of 160 kg of $H_2SO_4$ is used per tonne of lignin, the need for external sodium hydroxide to handle the purge of ESP-dust is 92 kg per tonne of lignin. Per tonne of pulp this corresponds to 30 kg $H_2SO_4$ and 17 kg NaOH. By using electrolysis of ESP-dust the input of $H_2SO_4$ and thus the need to purge ESP-dust is reduced.

Various embodiments of the present invention have been described above but a person skilled in the art realizes further minor alterations, which would fall into the scope of the present invention. The breadth and scope of the present invention should not be limited by any of the above-described exemplary embodiments, but should be defined only in accordance with the following claims and their equivalents. For example, any of the above-noted methods can be combined with other known methods. Other aspects, advantages and modifications within the scope of the invention will be apparent to those skilled in the art to which the invention pertains.

CITED DOCUMENTS

WO2006/031175
WO2006/038863
Magnus Norgren, "On the Physical Chemistry of Kraft Lignin, Fundamentals and Applications", Doctoral Thesis, Physical Chemistry 1, Lund University, 2001
Fredrik Öhman "Precipitation and separation of lignin from kraft black liquor", Forest products and Chemical Engineering, Department of Chemical and Biological Engineering, Chalmers University of Technology, Göteborg, Sweden, 2006
Öhman, F. & Theliander, H., "Washing lignin precipitated from kraft black liquor", Paperi Ja Puu, Vol. 88, no 5, 287-292 (2006)
Öhman, F., Wallmo, H. & Theliander, H., "A Novel method for washing lignin precipitated from kraft black liquor—Laboratory trails", Nordic Pulp and Paper Research J., 22 (2007): 1, 9-16
and
U.S. Pat. No. 4,561,945

While the present invention has been described in accordance with preferred compositions and embodiments, it is to be understood that certain substitutions and alterations may be made thereto without departing from the spirit and scope of the following claims.

The invention claimed is:

1. A method for separation of lignin from black liquor, comprising:
   precipitating lignin by acidifying black liquor with carbon dioxide resulting in a first lignin suspension;
   separation to form a lignin cake of a solid material of a first filter cake and a first filtrate,
   suspending the first filter cake to obtain a second lignin suspension,
   separating the second lignin suspension to form a second lignin cake of a solid material of the second filter cake and a second filtrate,
   adding a washing liquid for displacement washing of the second filter cake,
   enhancing a dryness of the second filter cake,
   obtaining filtrate from the displacement washing, the filtrate forming a part of the second filtrate,
   increasing an ionic strength by adding recovery boiler precipitator dust to at least a first portion of the second filtrate and adjusting the pH of the second filtrate to a value below 6,
   washing the first filter cake with the first portion of the second filtrate,
   the recovery boiler precipitator dust of the second filtrate keeping lignin in the first filter cake in solid form, and
   sending the first portion of the second filtrate to recovery after use as washing liquid, and
   adding a second portion of the second filtrate to the washed first filter cake to form the second lignin suspension, adjusting the pH level of the second lignin suspension to a value below 6 and approximately the pH level of the washing liquid added to the second filter cake.

2. The method according to claim 1 wherein the method further comprises conveying the second filtrate either for use in a displacement washing during the separation, or for diluting the first lignin suspension before separation.

3. The method according to claim 1 wherein the method further comprises adding a sulphuric acid and/or residual acid from chlorine dioxide manufacture for washing or suspension of the first filter cake.

4. The method according to claim 1 wherein the method further comprises adding a virgin sulphuric acid and/or sulphurous acid, both obtained from gaseous SO2, to the second lignin suspension.

5. The method according to claim 4 wherein the virgin sulphuric acid and/or sulphurous acid obtained from SO2 is added to the second filtrate.

6. The method according to claim 1 wherein the method further comprises conveying a portion of the second filtrate to perform a soap acidulation.

7. The method according to claim 1 wherein the method further comprises conveying a portion of the second filtrate to an external treatment.

8. The method according to claim 1 wherein the method further comprises adding a salt before the separation to form the first filter cake.

9. The method according to claim 2 wherein the method further comprises adjusting the pH of the second filtrate to be equal to or below the pH of the first precipitation stage.

10. The method according to claim 1 wherein the method further comprises blowing through the first or second filter cake with a gas to dispose of any remaining liquid.

11. The method according to claim 1 wherein the method further comprises re-circulating the first filtrate obtained from separation of the first lignin suspension to a pulp mill recovery system.

12. The method according to claim 1 wherein the method further comprises maturing the first lignin suspension.

* * * * *